July 10, 1956
M. O. AUNE
2,754,126
STRAW CUTTER AND SPREADER ATTACHMENT FOR COMBINES
Filed March 20, 1953
2 Sheets-Sheet 1
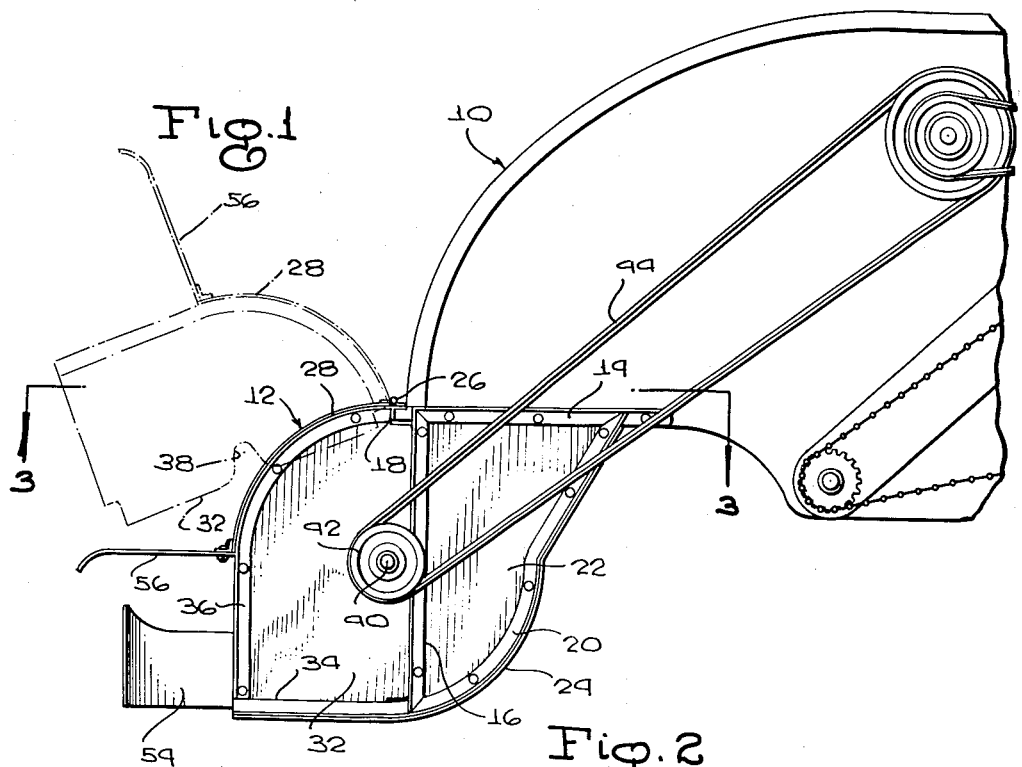
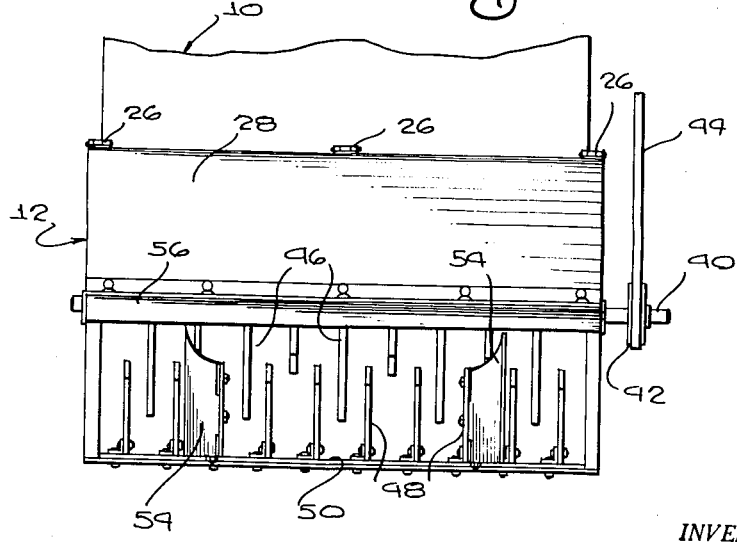
INVENTOR.
MELVIN O. AUNE
BY
McMorrow, Berman + Davidson
ATTORNEYS July 10, 1956     M. O. AUNE     2,754,126
STRAW CUTTER AND SPREADER ATTACHMENT FOR COMBINES
Filed March 20, 1953     2 Sheets-Sheet 2
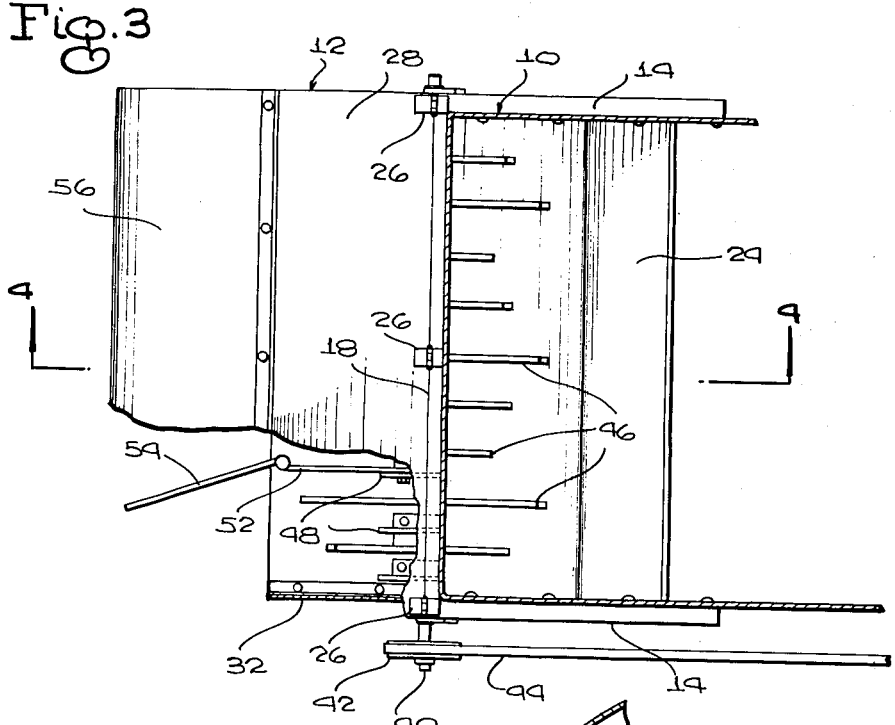
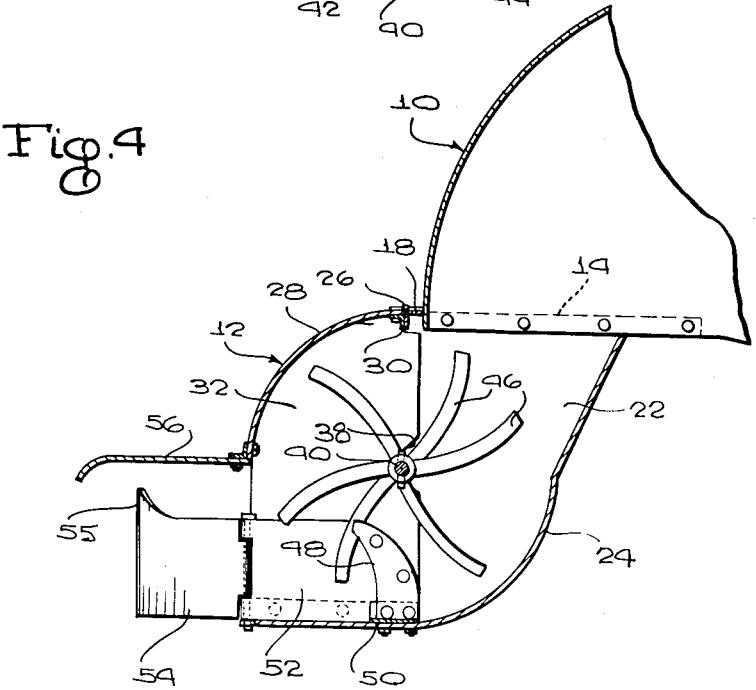
INVENTOR.
MELVIN O. AUNE
BY
McMorrow, Berman & Davidson
ATTORNEYS United States Patent Office 2,754,126
Patented July 10, 1956

2,754,126
STRAW CUTTER AND SPREADER ATTACHMENT FOR COMBINES

Melvin O. Aune, Gary, Minn.

Application March 20, 1953, Serial No. 343,678

3 Claims. (Cl. 275—3)

This invention relates to an improved straw cutting and spreading attachment for a combine, attachable to the discharge end of a combine hood, of the type having an enclosed series of rotary hammers alternating with stationary knives, the hammers, when driven from the combine, break up straw passing through the attachment, and coact with the stationary knives in cutting said straw to relatively short lengths, the attachment having a vaned outlet through which the cut straw is discharged, said outlet being designed to cause the straw to be uniformly distributed over the ground surface, in a wide path.

Among important objects of the invention are the following:

First, to provide an attachment which can be secured to a combine in minimum time and with little difficulty, without requiring modification or redesign of said combine;

Second, to provide hammers and knives so formed and relatively arranged as to efficiently break up the straw bunches discharged from the combine hood, and cut the straw into short lengths;

Third, to provide an improved deflecting means for the cut straw, that will insure the uniform distribution of the straw over a wide path, said means being designed to spread the straw laterally in opposite directions from the combine and being further adapted to prevent the straw from blowing back over the combine;

Fourth, to provide a hinged cover for the housing of the attachment, which cover will be adapted, when raised, to expose the entire interior of the attachment, thereby to facilitate cleaning and replacement of parts; and Fifth, to provide an attachment of the type stated which can be manufactured at low cost, but will nevertheless be rugged and substantially troublefree in operation.

Other objects will appear from the following description, the claims appended thereto, and from the annexed drawings, in which like reference characters designate like parts throughout the several views, and wherein:

Figure 1 is a side elevational view of a combine attachment formed in accordance with the present invention;

Figure 2 is a rear elevational view, the combine hood being illustrated fragmentarily;

Figure 3 is a plan sectional view on line 3—3 of Figure 1, portions being broken away; and Figure 4 is a longitudinal sectional view on line 4—4 of Figure 3.

Referring in detail to the drawings, the numeral 10 generally designates a combine hood of conventional design, to which an attachment 12 according to the present invention is connectible without requiring modification or redesign of the hood.

The attachment comprises a housing which is connected beneath and to the opposite bottom side edges of the hood 10 by means of horizontal mounting bars 14 of angle iron or the like, said bars being bolted to the opposite sidewalls of the combine hood. Rigid with the rear ends of the bars 14 are the upper ends of vertically depending side frame bars 16, and rigid at its opposite ends with the upper ends of said frame bars 16 is a horizontal cross bar 18. Cross bar 18 (Figure 3) extends transversely of hood 10, fully from side to side of the hood, along the rear transverse edge of the hood.

Extending from the bottom ends of the frame bars 16 to the front end portions of the respective bars 14 are front frame members 20, also of angle iron or similar material. Frame members 20 (Figure 1) have their lower end portions curved downwardly and rearwardly, the arc of the curvature being concentric with the axis of rotation of a series of rotary hammers to be described hereinafter. The upper end portions of the front frame members 20 are straight, and are inclined forwardly to the front ends of the bars 14.

Bolted at their peripheral edges to the bars 14, 16, and 20 at each side of the attachment are side walls 22, and extending between and affixed to the front frame members 20 is a transverse front wall 24.

Hinges 26 are carried by and are spaced longitudinally of the cross bar 18 (Figure 3), and are connected to the front edge of a rearwardly and downwardly curved top wall 28. The top wall 28 constitutes part of a hinged cover for the attachment housing, which cover can be swung between the full and dotted line positions shown in Figure 1.

To reinforce the front edge portions of the cover top wall 28, a cross member 30 is provided (Figure 4), said cross member 30 being connected by bolts or the like to the cover top wall 28 and to the respective hinges 26.

The cover also includes side walls 32, reinforced at their marginal edges by bars 34, 36 respectively, the bars 36 being formed with longitudinally curved upper end portions extending along the opposite side edges of the cover top wall 28.

The cover side walls 32, as best shown in Figure 1, are formed, intermediate their upper and lower ends of their front edges, with large notches 38, to provide clearance for a drive shaft 40 extending transversely of the housing and journaled at its opposite ends in bearings carried by the midlength portions of the frame members 16. Shaft 40 is driven through the medium of a pulley 42 secured to one end thereof, a belt 44 being trained about said pulley and being also trained about a drive pulley carried by the cylinder shaft of the combine.

Secured to and spaced longitudinally of the shaft 40 are hammer arms 46 which are arranged in diametrically opposed pairs. The hammer arms are curved intermediate their ends and are fixed at their inner ends to a hub made rigid with the shaft 40. The directions of curvature of the opposed hammer arms are reversed. The pairs of hammer arms are spaced alternately around the shaft 40 along the length of the shaft 40, and the hammer arms curve in a direction opposite to the direction of rotation of the shaft. Said direction of rotation is clockwise as viewed in Figure 4.

The hammer arms 46 are disposed in the path of straw fed into the attachment from the combine hood, and are so designed as to break up the straw bunches efficiently, the broken straw being forced through a series of stationary knives 48 mounted on the bottom wall 24 of the housing. Knives 48 are located between adjacent pairs of hammer arms 46, and between hammer arms and the end walls 32 of the housing, and are bolted at their bases to a flat knife base 50 secured to the bottom wall 24 of the housing directly beneath the shaft 40. As will be noted from Figure 4, each knife tapers in the direction of its upper or free end, the knives being curved upwardly and rearwardly in the direction in which the straw is moving through the housing. Both side edges of each knife are sharpened, preferably.

Spaced transversely of the housing are stationary straw guide plates 52, said plates 52 being bolted at their lower edges to angle iron supports extending rearwardly from the knife base 50 to the outlet or rear end of the housing. The guide plates 52 are disposed in vertical planes normal to the axis of rotation of the hammer arms 46, and serves to separate the mass of cut straw, after said straw has been acted upon by the hammers and knives, into side by side flow columns. Separate flow columns of straw pass between the deflector plates 52, and are discharged rearwardly out of the open rear end of the housing without being forced laterally. The natural effect of the relatively light, cut straw after being so discharged is to spread laterally to a slight extent, as will be appreciated. Hinged to the rear edges of the guide plates 52 are laterally swingable deflector vanes 54, which vanes 54 have upwardly extending, tapered projections 55 at their rear, upper corners. The vanes 54 can be secured at selected angles relative to the path of the straw flowing out of the housing, by tightening of the hinge bolts of the hinge assemblies which connect the vanes to their associated guide plates 52. Normally, the vanes 54 will be set in directions away from the housing, so as to deflect the side flow columns of the cut straw laterally and outwardly, in opposite directions from the housing. The straw is thus uniformly distributed over a relatively wide path, so as not to be piled in excessively deep rows upon the ground in a manner that would make subsequent discing or plowing difficult.

Overlying the vanes 54 is a shield 56, said shield extending fully from side to side of the housing and has a downwardly curved rear edge. The shield 56 is horizontally disposed, and projects rearwardly from the top edge of the housing outlet, the inner edge of the shield being bolted to the depending edge portion of the cover top wall 28. The downwardly curved rear edge portion of the shield cooperates with the vanes 54 in deflecting the cut straw along desired paths, and the shield serves the further function of preventing the straw from blowing back over the combine.

As will be noted from Figure 1, the shield 56, cover top wall 28, and cover side walls 32 together provide a hinged cover which can be swung upwardly to the dotted line position shown. When the cover is elevated in this manner, it exposes the entire interior of the housing, to facilitate cleaning or replacement of parts. Access is readily had to any selected hammer arms or knife, and further, the bearings of the shaft are conveniently exposed for lubrication or for replacement.

It will be seen that the entire device can be attached to a conventional combine with maximum speed and with minimum difficulty. When so attached, the device acts upon straw normally discharged in uncut lengths from the combine hood, and cuts said straw into small pieces, while at the same time discharging the straw uniformly over the ground surface. In this way, subsequent discing or plowing of the ground is facilitated, and the straw is in a condition in which it will be readily assimilated by the soil.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a straw cutting and spreading attachment for a combine, a housing comprising a horizontal bottom wall having a rear end and a front end and side walls on and rising from opposite sides of the bottom wall, a hammer shaft journaled on and extending between said side walls on a level spaced above said bottom wall and at the front end of the bottom wall, means for rotating said hammer shaft clockwise toward the rear end of said bottom wall, hammer assemblies fixed to and spaced along said shaft and spaced around the shaft from each other, each hammer assembly comprising a pair of oppositely and longitudinally curved hammer arms, the hammer arms being curved in the direction opposite to the rotation of the hammer shaft, vertical knives having upper and lower ends and front and rear edges, said knives having their lower ends fixed to said bottom wall with the knives in vertical alignment beneath the hammer shaft, the front and rear edges of the knives being upwardly and rearwardly curved, the knives being located between adjacent hammer assemblies and between hammer assemblies and the housing side wall, a pair of vertical straw guide plates having lower edges fixed to said housing bottom wall and rising between hammer assemblies and adjacent knives, said guide plates reaching rearwardly from the knives to the rear end of the housing bottom plate, said guide plates having upper edges on a level with the upper ends of the knives and having rear ends terminating at the rear end of the housing bottom wall.

2. In a straw cutting and spreading attachment for a combine, a housing comprising a horizontal bottom wall having a rear end and a front end and side walls on and rising from opposite sides of the bottom wall, a hammer shaft journaled on and extending between said side walls on a level spaced above said bottom wall and at the front end of the bottom wall, means for rotating said hammer shaft clockwise toward the rear end of said bottom wall, hammer assemblies fixed to and spaced along said shaft and spaced around the shaft from each other, each hammer assembly comprising a pair of oppositely and longitudinally curved hammer arms, the hammer arms being curved in the direction opposite to the rotation of the hammer shaft, vertical knives having upper and lower ends and front and rear edges, said knives having their lower ends fixed to said bottom wall with the knives in vertical alignment beneath the hammer shaft, the front and rear edges of the knives being upwardly and rearwardly curved, the knives being located between adjacent hammer assemblies and between hammer assemblies and the housing side wall, a pair of vertical straw guide plates having lower edges fixed to said housing bottom wall and rising between hammer assemblies and adjacent knives, said guide plates reaching rearwardly from the knives to the rear end of the housing bottom plate, said guide plates having upper edges on a level with the upper ends of the knives and having rear ends terminating at the rear end of the housing bottom wall, and laterally and swingably adjustable vertical deflector plates having front ends hinged on the rear ends of the guide plates.

3. In a straw cutting and spreading attachment for a combine, a housing comprising a horizontal bottom wall having a rear end and a front end and side walls on and rising from opposite sides of the bottom wall, a hammer shaft journaled on and extending between said side walls on a level spaced above said bottom wall and at the front end of the bottom wall, means for rotating said hammer shaft clockwise toward the rear end of said bottom wall, hammer assemblies fixed to and spaced along said shaft and spaced around the shaft from each other, each hammer assembly comprising a pair of oppositely and longitudinally curved assembly arms, the hammer arms being curved in the direction opposite to the rotation of the hammer shaft, vertical knives having upper and lower ends and front and rear edges, said knives having their lower ends fixed to said bottom wall with the knives in vertical alignment beneath the hammer shaft, the front and rear edges of the knives being upwardly and rearwardly curved, the knives being located between adjacent hammer assemblies and between hammer assemblies and the housing side wall, a pair of vertical straw guide plates having lower edges fixed to said housing bottom wall and rising between hammer assemblies and adjacent knives, said guide plates reaching rearwardly from the knives to the rear end of the housing bottom plate, said guide plates having upper edges on a level with the upper ends of the knives and having rear ends terminating at the rear end of the housing bottom wall, and laterally and swingable adjustable vertical deflector plates having front ends hinged on the rear ends of the guide plates, and a horizontal shield extending rearwardly from said housing over said deflector plates and spaced above the deflector plates.

References Cited in the file of this patent

UNITED STATES PATENTS

| Number | Name | Date |
|---|---|---|
| 1,101,530 | Eilts | June 30, 1914 |
| 2,281,846 | Klein | May 5, 1942 |
| 2,343,303 | Kuhlman | Mar. 7, 1944 |
| 2,476,465 | Tarrant | July 19, 1949 |
| 2,554,669 | Elofson | May 29, 1951 |
| 2,611,407 | Alloway | Sept. 23, 1952 |
| 2,626,159 | Thompson | Jan. 20, 1953 |
| 2,631,418 | Ronning | Mar. 17, 1953 |
| 2,670,775 | Elofson | Mar. 2, 1954 |
| 2,708,582 | Adams | May 17, 1955 |